UNITED STATES PATENT OFFICE.

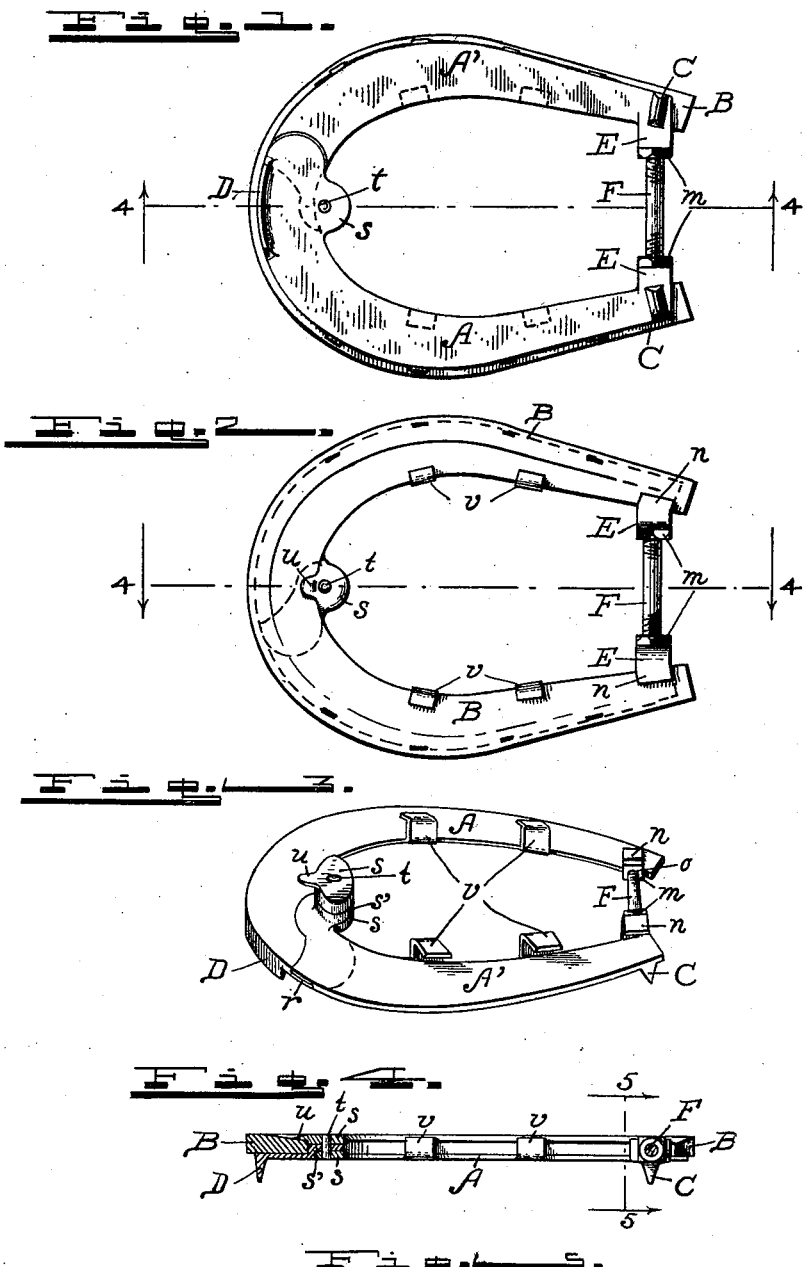

WILLIAM H. HACKLEY, OF NORTH SALEM, INDIANA.

ADJUSTABLE ICE ATTACHMENT FOR HORSESHOES.

SPECIFICATION forming part of Letters Patent No. 565,455, dated August 11, 1896.

Application filed December 6, 1895. Serial No. 571,283. (No model.)

*To all whom it may concern:*

Be it known that I, WILLIAM H. HACKLEY, a citizen of the United States, residing at North Salem, in the county of Hendricks and State of Indiana, have invented certain new and useful Improvements in Adjustable Ice Attachments for Horseshoes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in adjustable ice attachments for horseshoes of the class that are adapted to be attached to a horseshoe when on the horse's hoof, for the purpose of preventing slipping on icy pavements; and the objects of my invention are, first, to provide an attachment for horseshoes that will prevent the horse slipping on icy roads or pavements; second, that can be readily attached and adjusted to fit any sized horseshoe; third, that can be attached to a horseshoe while on the horse's hoof; fourth, that will enable the owner to use the horse on icy roads without removing the smooth shoes commonly used, and without the consequent expense necessary to replace the smooth shoes with sharp or rough ones, and that will be easily applied and reasonably cheap of manufacture.

With these objects in view my invention consists in the construction and combination of the various parts for the purpose above described.

In the drawings, Figure 1 is a plan view of the under side as it appears on the horseshoe. Fig. 2 is a top plan view as attached to a horseshoe. Fig. 3 is a perspective view of the attachment alone. Fig. 4 is a cross-sectional view on the line 4 4 of Figs. 1 and 2; and Fig. 5 is an enlarged view of one end of the expanding-bolt on the line 5 5 of Fig. 4, showing its application to the plate.

The plate consists of sections A and A', hinged together at the forward part by means of the projecting lugs $s$ and $s'$ and secured by the rivet $t$. At the front of the upper lug $s$ is a projecting portion $u$, which is adapted to project over the shoe B. The sections A and A' of the plate are each provided with two projecting portions $v$, which are bent upward and outward at right angles for the purpose of securing the plate to the shoe B when placed in position. The plate is also provided with the sharp heel-calks C, and the section A of the plate has the sharp toe-calk D. The section A is longer than the section A' for the purpose of supporting the toe-calk D, and the two sections are each cut away at $r$, so the ends will overlap to give additional strength, yet at the same time leave both the upper and lower surfaces of the plate flat and smooth. The rear ends of the plate are each provided with the box-like extension E, having projecting flanges $n$ to engage and hold the shoe B. The inner faces of the extensions E are provided with openings $o$, through which the ends of the expanding-bolt F pass. The bolt F is threaded at each end and is provided with nuts $m$.

To place the attachment on the shoe, the nuts $m$ are turned back toward the center of the bolt to allow the sections A and A' to close sufficiently to allow the projecting portions $v$ and $n$ to pass the inner edge of the shoe, and the sections A and A' are then opened until the projecting portions $u, v$, and $n$ engage with and extend over the upper edge of the shoe. The nuts $m$ are then tightened against the box-like projections E, which firmly holds the ends of the sections against the inner edge of the shoe and prevents their closing together and thus releasing the projecting portions $u, v,$ and $n$ from engaging with the upper face of the shoe.

It will be seen that the attachment cannot by any chance be removed from the shoe until the nuts $m$ are loosened on the bolts F. It is also apparent that the attachment can be put on and taken off readily and without taking the horse to a farrier and that the attachment readily adjusts itself to different sizes of shoes.

It frequently occurs that sleet or rain forms into ice in a few hours and makes it impossible to use a horse which is not rough shod. With my attachment a horse can be rough shod in a few moments without the necessity of removing the old shoes or the expense of putting on new ones.

Having described my invention, what I claim, and desire to secure by Letters Patent, is—

1. In an adjustable attachment for horseshoes, the combination of a plate consisting of a long member A having two hinge-lugs $s$, and a short member A' having one hinge-lug $s'$ adapted to fit between the two hinge-lugs $s$, with boxed extensions E provided with openings $o$ to receive the ends of an expanding-bolt F, substantially as set forth.

2. The combination in an adjustable non-slipping attachment for horseshoes, of the section A, having two hinge-lugs $s$, and having a heel and a toe calk C and D; the section A', shorter than the section A, and having one hinge-lug $s'$, and carrying a heel-calk C; with box-like extensions E, having the flanges $n$, and the openings $o$, to receive the ends of the bolt F, substantially as shown and described.

3. In an adjustable non-slipping attachment for horseshoes, having a long section A, and a short section A', the combination of the projecting hinge-lugs $s$ and $s'$, with the box-like extensions E on both sections having the flanges $n$ and the openings $o$ to receive the ends of an expanding-bolt F, as set forth.

4. As an article of manufacture, an adjustable non-slipping attachment for horseshoes consisting of a plate formed in two sections, one section being of greater length than the other and provided with two hinge-lugs $s$, the other section being shorter and provided with one hinge-lug $s'$, the hinge-lug $s'$ adapted to lie between the hinge-lugs $s$, and both to be joined together by means of a rivet $t$, a forward projection on the upper one of the lugs $s$, and box-like extensions attached near the outer or rear ends of the sections having flanges $n$ and openings $o$ to receive an expanding-bolt F, as shown and described.

5. An adjustable non-slipping attachment for horseshoes, consisting of two hinged sections of unequal length, having inwardly-projecting hinge-lugs; box-like extensions near the rear ends of the sections, having flanges $n$, and openings $o$ adapted to carry an expanding-bolt, substantially as set forth.

In testimony whereof I affix my signature in presence of two witnesses.

WILLIAM H. HACKLEY.

Witnesses:
 W. M. DUNLAP,
 L. B. UNGER.